United States Patent
Stava et al.

(10) Patent No.: US 7,271,365 B2
(45) Date of Patent: Sep. 18, 2007

(54) SYSTEM AND METHOD FOR PULSE WELDING

(75) Inventors: Elliott K. Stava, Sagamore Hills, OH (US); Russell K. Myers, Hudson, OH (US)

(73) Assignee: Lincoln Global, Inc., City of Industry, CA (US)

( * ) Notice: Subject to any disclaimer, the term of this patent is extended or adjusted under 35 U.S.C. 154(b) by 274 days.

(21) Appl. No.: 11/103,040

(22) Filed: Apr. 11, 2005

(65) Prior Publication Data

US 2006/0226131 A1 Oct. 12, 2006

(51) Int. Cl.
B23K 9/09 (2006.01)

(52) U.S. Cl. .............. 219/130.51; 219/130.33

(58) Field of Classification Search ........... 219/130.51, 219/130.33, 137 PS, 130.21
See application file for complete search history.

(56) References Cited

U.S. PATENT DOCUMENTS

| 3,560,702 | A |   | 2/1971  | Arikawa et al. |
|-----------|---|---|---------|----------------|
| 3,573,426 | A |   | 4/1971  | Blake et al. |
| 4,020,320 | A |   | 4/1977  | Pijls et al. |
| 4,319,124 | A | * | 3/1982  | Johansson ............... 219/130.51 |
| 4,427,874 | A |   | 1/1984  | Tabata et al. |
| 4,438,317 | A |   | 3/1984  | Ueguri et al. |
| 4,564,735 | A |   | 1/1986  | Dufrenne |
| 4,794,232 | A | * | 12/1988 | Kimbrough et al. ... 219/130.51 |
| 4,866,247 | A |   | 9/1989  | Parks et al. |
| 4,889,969 | A |   | 12/1989 | Kawai et al. |
| 5,212,361 | A |   | 5/1993  | Miyazaki et al. |
| 5,990,445 | A |   | 11/1999 | Ogasawara et al. |
| 6,025,573 | A |   | 2/2000  | Stava |
| 6,091,048 | A |   | 7/2000  | Lanouette et al. |
| 6,225,598 | B1 |   | 5/2001 | Nihei et al. |
| 6,501,049 | B2 | * | 12/2002 | Stava ................... 219/137 PS |
| 6,600,135 | B2 |   | 7/2003 | Tong |
| 7,145,101 | B2 | * | 12/2006 | Tong ..................... 219/130.51 |
| 2002/0030043 | A1 | * | 3/2002 | Tong ..................... 219/130.51 |

FOREIGN PATENT DOCUMENTS

JP 53-67657 A 6/1978

* cited by examiner

*Primary Examiner*—Clifford C. Shaw
(74) *Attorney, Agent, or Firm*—Fay Sharpe LLP

(57) ABSTRACT

Systems and methods are provided for pulse welding, in which a welding signal is provided to an electrode in series of pulse welding cycles, where the amount of energy applied to the electrode in each cycle is determined and a pulse is provided to initiate a transfer condition of each cycle based at least partially on the energy applied in the cycle.

35 Claims, 7 Drawing Sheets

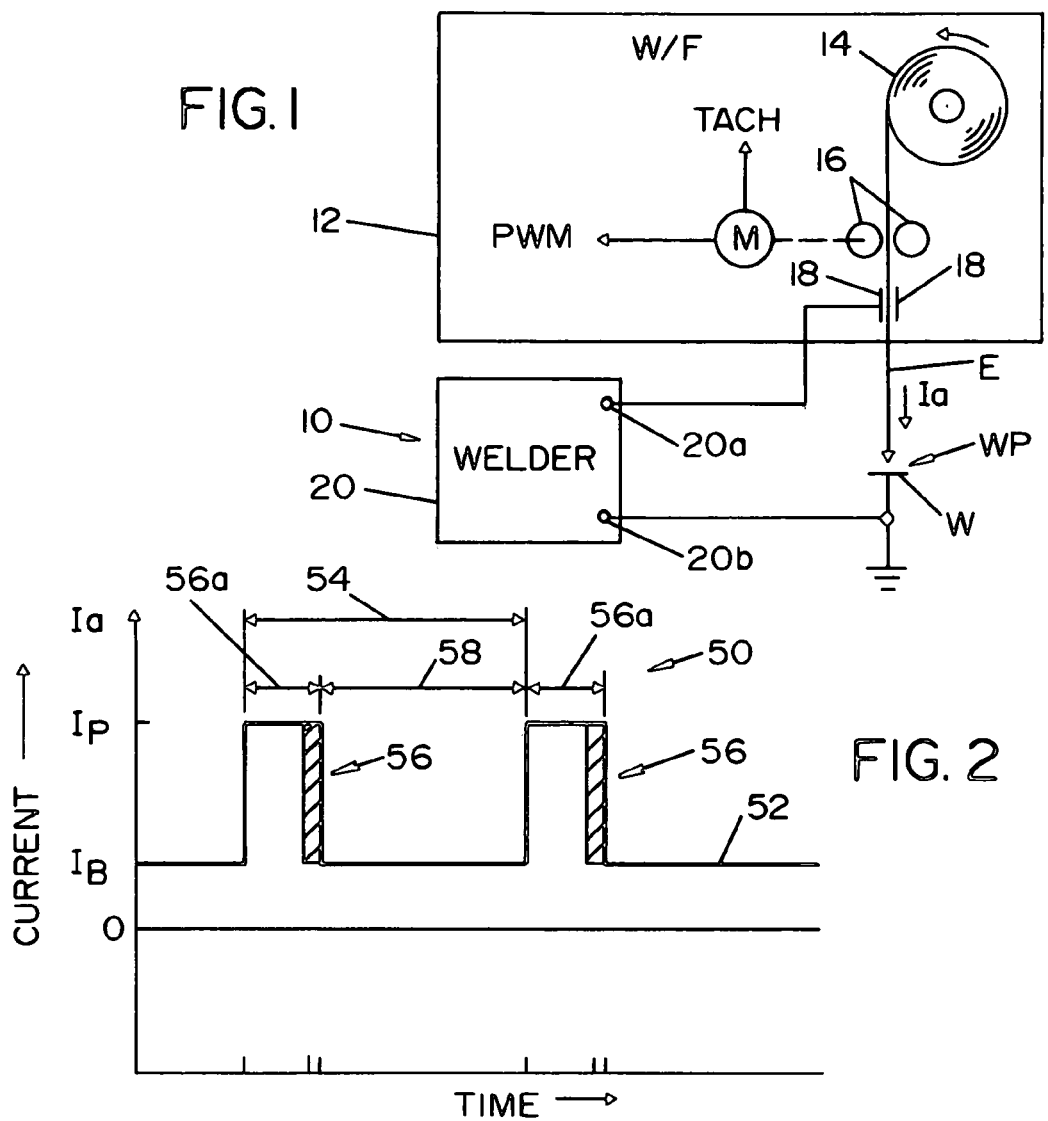
FIG. 1
FIG. 2
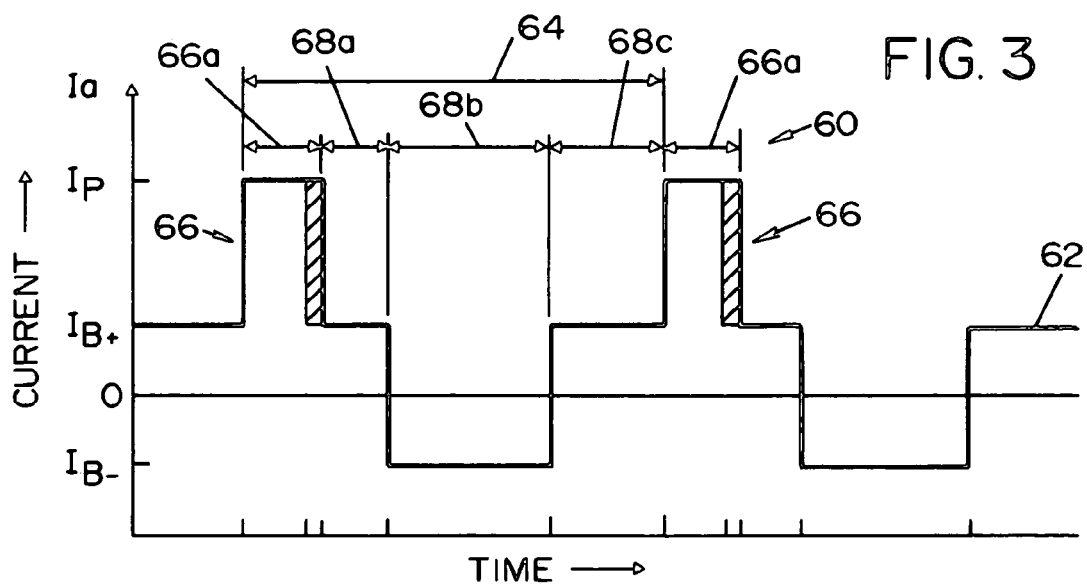
FIG. 3

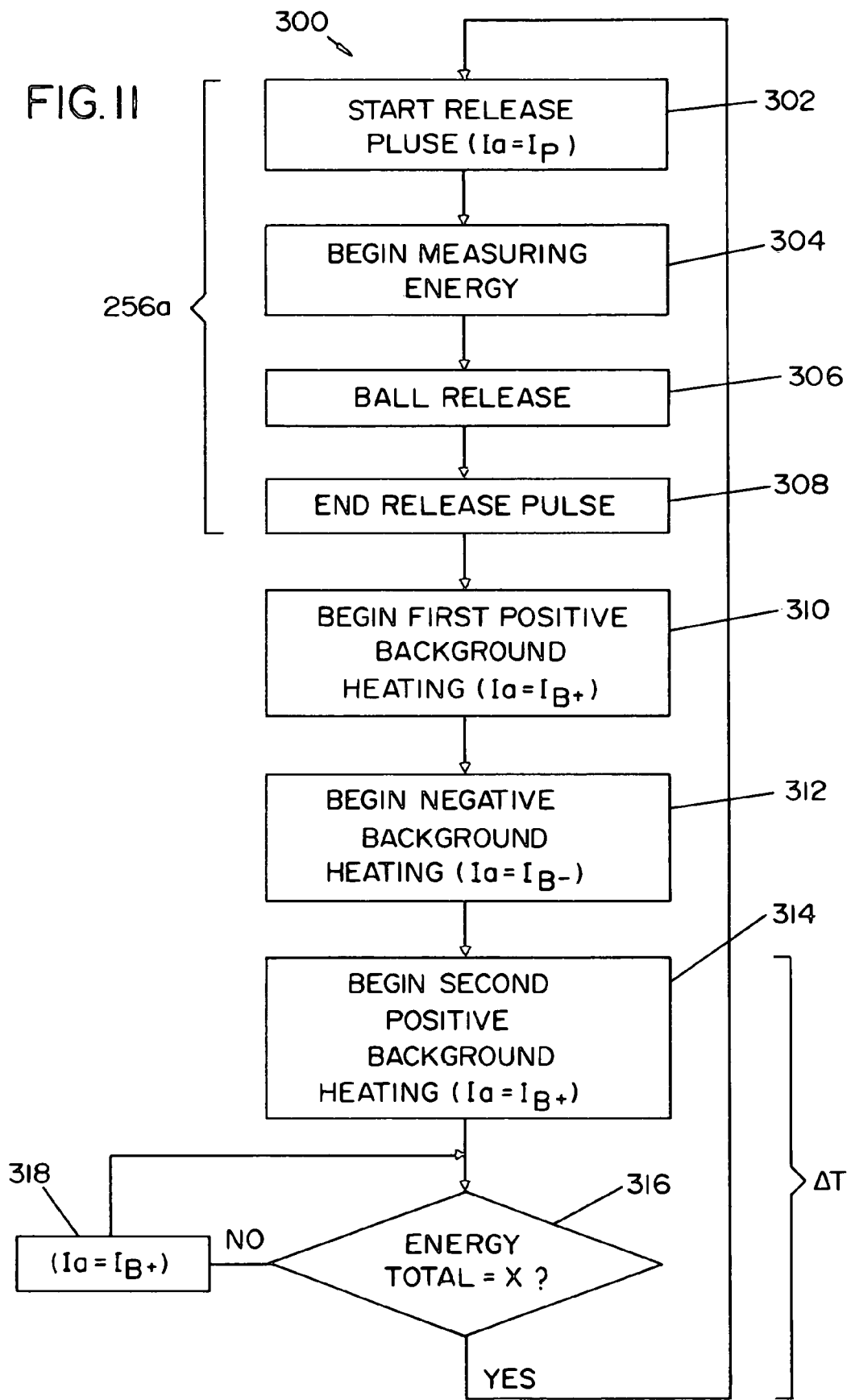

SYSTEM AND METHOD FOR PULSE WELDING

FIELD OF THE INVENTION

The present invention relates generally to the field of welding, and more particularly to methods and systems for pulse welding.

BACKGROUND OF THE INVENTION

Arc welding is a process of joining metals by applying an arc to provide filler material in a molten metal pool or puddle on a workpiece. Various arc welding methodologies have been developed in which material from a consumable welding wire or electrode is melted and transferred to the workpiece. Many arc welding processes, such as metal inert gas (MIG) techniques employ a shielding gas around the welding arc to inhibit oxidation or nitridation of the molten metal. Non-inert shielding gases such as $CO_2$ may also be used, whereby such processes are sometimes generally referred to as gas metal arc welding (GMAW). Other arc shielding processes similarly provide a protective shield of vapor or slag to cover the arc and molten weld pool. In the case of MIG welding, the molten material may be transferred from a consumable welding wire or electrode to the workpiece by several mechanisms or processes, including short-circuit welding, spray arc welding, and pulse welding. Short circuit welding techniques involve electrical connection of molten metal to both the electrode and the weld pool during a portion of each welding cycle, wherein the molten material contacts (is electrically shorted to) the workpiece or the weld pool thereof prior to separating from the electrode. This type of welding is prone to spatter that disrupts the weld pool and/or to cold lapping where there is not enough energy in the puddle for the filler material to fuse properly to the workpiece. In addition, short-circuit welding techniques suffer from low deposition rates compared with pulse or spray welding. Non-contact or non-short circuit welding approaches involve transfer of molten metal from the end of the electrode across the welding arc to the workpiece through electromagnetic forces, wherein the electrode ideally never electrically contacts the workpiece (no short-circuit condition). Non-short circuit welding includes so-called spray arc and pulse welding processes. Spray arc welding is a relatively high energy process in which small molten droplets are propelled from the electrode to the workpiece, typically employing a constant voltage (CV) to produce enough current to send a constant stream of metal off the electrode at a rate of hundreds of droplets per second. This technique exhibits rather high heat input and is useful only over a limited range of welding positions. Spray welding is also prone to burnthrough on thin workpiece materials.

Pulse welding offers an alternative non-contact process for electric arc welding that utilizes lower heat to generate a less fluid molten metal puddle on the workpiece. This facilitates out of position welding and improves various mechanical aspects of the welding process, without the high spatter issues of short-circuit welding and without the risk of burnthrough found in spray welding, particularly for thin workpieces. Pulse welding is performed by high-speed manipulation of the electrical signal applied to the electrode and is designed to be a spatterless process that will run at a lower heat input than spray or globular transfer methods. In general, pulsed MIG processes involve forming one droplet of molten metal at the end of the electrode (a melting condition) and then transferring the molten material using an electrical transfer pulse (a transfer condition) in each of a sequence of welding cycles, where the droplet transfer occurs through the arc, one droplet per pulse, without short-circuiting the electrode to the workpiece. Unlike constant voltage welding processes, pulse welding employs a high energy pulse to initiate the transfer condition in each welding cycle, and the welding current is then dropped to a background current level to begin melting the end of the electrode to form the next molten metal ball. In this regard, pulse welding allows the workpiece to cool after each molten ball is transferred to the weld pool, whereby pulse welding is less susceptible to burnthrough for thin materials than is spray welding. Moreover, pulse welding does not suffer from spatter problems or cold lapping, as is the case for short-circuit welding. As the electrode advances, the pulse welding process transfers small droplets directly through the welding arc, with the objective being one droplet during each pulse.

Ideally, a molten metal droplet or ball is formed on the end of the electrode by electrode heating from the background current, and is thereafter transferred across the arc to the workpiece by the high current pulse without short-circuiting. The pulse preferably causes the molten metal to separate from the electrode by an electric pinch action, after which the molten metal mass or droplet is propelled across the arc to the weld pool of the workpiece. In this regard, the energy in the current pulse used for separating and propelling the molten metal to the workpiece is an important parameter of the overall pulse welding process. The electric pinch action exerted on the droplet to constrict and separate the droplet from the electrode is roughly proportional to the square of the applied current during the current pulse, and to a point, higher pulse current during droplet separation results in more rapid transfer to the workpiece and consequently a superior welding process. However, the arc current also exerts a magnetic force on the molten weld pool on the workpiece, pushing the weld puddle downwardly away from the end of the electrode, wherein this downward force may push the molten metal outwardly and cause a puddle depression below the electrode. This depression and the associated electromagnetic forces can cause extreme weld puddle agitation for high pulse current levels, especially when welding metals aluminum or other material having low specific gravity, leading to a poor weld bead appearance and excessive penetration of the metal into the workpiece.

Thus, the ball separation pulse needs to be tailored to accurately control the pinch action, while minimizing the puddle agitation, wherein the magnitude and shape of the current pulse is ideally set to provide a smooth metal transfer with a minimum puddle agitation. This, of course, is a tradeoff, wherein a pulse that does not contain sufficient energy may lead to short circuit conditions and the associated spatter problems. In particular, a relatively weak pulse may fail to fully separate the molten metal from the remainder of the electrode before the ball engages the weld puddle, causing a substantial amount of spatter. Thus, the electric pulse must have a certain minimal amount of energy to allow efficient transfer of a given amount of molten metal to avoid short circuit conditions. However, if the energy in the current pulse is too great, severe puddle agitation occurs. Because of this inherent tradeoff, the length of the current pulse is commonly extended in order to ensure ball transfer without short circuiting, while permitting some amount of puddle agitation and/or extra workpiece heating. Such overcompensation to avoid short-circuit conditions, however, is not universally acceptable, particularly for more susceptible processes, such as very thin workpieces. Furthermore, the welding pulse parameters may need to be tailored to produce a stable arc with a minimum arc length and spatter, for a given wire size, chemistry, blend of shielding gas, and wire feed speed. Non-optimal electrode current waveforms results in excessive spatter or an excessive arc length, wherein a long arc can lead to a contaminated weld and reduced overall welding travel speed.

In addition to crafting the pulse amplitude and duration, the background current and the duration of the melting condition may need to be adjusted for an effective pulse welding process. For instance, the background current level generally affects the overall heat provided to the workpiece and also controls the molten ball formation on the electrode tip. In addition, some of the pulse energy may also operate to melt electrode material prior to ball separation. The electrode heating includes resistance heating by current flow through the wire from the wire feeder electrical connection (holder) to the end of the wire, as well as anode heating at the end of the wire, which varies with the effective arc current, wherein the anode heating generally contributes the majority of the melting energy during each welding cycle. In this regard, as the extension or stick-out length (e.g., the distance from the holder to the end of the electrode) increases, a larger portion of the heating per cycle is resistance heating caused by current flow through the welding wire. Conversely, as the stick-out decreases, less heating is by resistance heating of the wire. With respect to variations in the size of the transferred material, if the molten ball is too small at the beginning of the transfer condition, the pulse current may cause the ball to be "stretched" or pulled as pinch forces attempt to detach the droplet, in which case the bottom of the molten ball can contact the weld puddle (short-circuit), resulting in spatter. Conversely, if the formed molten ball is larger, the pulse current will tend to detach the droplet without "stretching" the molten mass. Thus, for a given welding process, the pulse shape, and the level and duration of the background melting current are preferably selected or adjusted such that only a minimum amount of the pulse energy contributes to additional electrode heating, wherein the pulse current wave shape essentially serves only as a means to detach the droplet. However, this situation is only achievable if the volume of the molten metal ball is repeatable and uniform for each welding cycle at the time the high current pulse is applied. In conventional pulse welding processes, the welding waveform (e.g., background current and high current transfer pulse) is repeated in a series of welding cycles without variation, wherein the fixed waveform is preferably selected to achieve the proper ball size, arc length, and transfer characteristics in each cycle to provide good performance and weld quality. However, process variation is inevitable as conditions, materials, temperatures, etc. change over time or from one workpiece to the next. Consequently, there is a need for improved pulse welding methods and systems by which repeatable high speed and high deposition rate pulse welding operations can be achieved for a given transfer pulse and background current welding waveform without short-circuit conditions and without weld pool contamination or puddle agitation.

SUMMARY OF THE INVENTION

A summary of one or more aspects of the invention is now presented in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The present invention relates to apparatus and methods for pulse welding in which the initiation of the molten metal transfer is controlled according to the amount of energy applied to the electrode. The invention may be employed to facilitate pulse welding in which the size (e.g., volume) of molten material is generally uniform at the beginning of the transfer pulse, such that the pulse waveform can be tailored to produce good transfer characteristics with little or no energy from the transfer pulse adding to the electrode heating. The initiation of the pulse based on applied energy, moreover, allows tailoring of the transfer pulse at or near the minimal energy to achieve repeatable non-short-circuit ball transfer without excessive pulse heating, wherein the pulse operates primarily to transfer the molten ball (e.g., to separate or detach the molten material from the electrode). Thus, during each welding cycle a selected constant amount of energy is applied to the wire for heating of the wire, wherein the welding power source or a controller associated therewith initiates the transfer pulse when a predetermined amount of energy has been applied independent of arc current and voltage fluctuations or other process variations. The applied energy can be correlated with the volume of molten material at the end of the electrode, so that the size of the transferred molten ball is essentially the same for each cycle. This predictable ball size, in turn, allows the transfer pulse size and shape to be tailored to properly detach the ball without stretching, without short-circuiting, and without the pulse energy contributing significantly to the electrode heating, by which a predictable volume of molten metal can be repeatably transferred in each welding cycle.

In accordance with an aspect of the present invention, a pulse welding system is provided for welding a workpiece in a pulse welding process, where the molten ball is transferred in each welding cycle by a pulse that is initiated according to the energy applied to the electrode. The system includes a wire feeder that directs a welding wire or electrode toward a workpiece, as well as a power source that provides a welding signal to the electrode in a plurality of pulse welding cycles, wherein each welding cycle includes a melting condition a transfer condition in which molten metal is separated from the end of the welding electrode before the molten metal contacts the workpiece (e.g., without short-circuiting). In this aspect of the invention, the power source provides a pulse to initiate the transfer condition based at least partially on an amount of energy applied to the welding electrode in a welding cycle.

The system may be employed in any type of pulse welding process, including submerged arc welding (SAW), metal inert gas (MIG) welding, metal active gas (MAG) welding, etc., wherein molten metal is separated from the end of the welding electrode before the molten metal contacts the workpiece. Moreover, the invention finds utility in welding with any type of welding wire or electrode, including but not limited to solid wire electrodes and cored electrodes having an inner core and an outer sheath (e.g., flux cored electrodes). In addition, the pulse welding process may be performed on any type of workpiece materials, such as metals and alloys, for example, aluminum, steel, etc.

The power source may include or be coupled with a controller that provides a control input signal based on the applied energy, where the power source provides the welding signal according to the signal to create a succession of pulse welding cycles having a melting condition and a transfer condition. In one embodiment, the controller provides the control input signal when the energy applied to the welding electrode in the welding cycle reaches a predetermined energy value. The controller may include an energy measurement system which receives signals representing the welding signal current and voltage, and which integrates the product of the current and voltage over time to determine or compute the applied energy in all or a portion of a cycle. The totalized applied energy is compared with a reference value and the transfer pulse is initiated when the total energy value reaches the reference value, by which the pulse is started according to applied energy. The energy determination may also take into account different correlations between applied energy and the volume of molten material, for example, where the current-voltage product is scaled by a different scaling factor or constant for positive and negative portions of an AC pulse welding waveform, whereby the total determined energy is reflective of the volume of molten metal and the pulse is initiated when a certain ball size is achieved.

Another aspect of the invention relates to a control system or controller for providing a control input signal to a pulse welding power source. The control system includes an energy measurement system for measuring the energy applied to the welding electrode in each welding cycle. The control system provides the control input signal such that a pulse is provided in the welding signal to initiate the transfer condition of each welding cycle when the energy applied to the welding electrode in the welding cycle reaches a predetermined energy value.

According to yet another aspect of the invention, a method is provided for welding a workpiece. The method comprises providing a welding signal to a welding electrode in a succession of pulse welding cycles, each welding cycle including a melting condition and a transfer condition without short-circuit conditions. The method further includes determining the energy applied to the welding electrode in each welding cycle and providing a pulse to initiate the transfer condition based at least partially on an amount of energy applied to the welding electrode in the welding cycle. In one implementation, the pulse is provided to initiate the transfer condition when the applied energy reaches a predetermined energy value. The applied energy may be determined using any suitable technique, such as by integrating the instantaneous product of the welding voltage and the welding current during each cycle. The welding signal may comprise an AC current during the melting condition, with a positive arc portion and a negative arc portion, with the energy determination comprising integrating the instantaneous product of the welding voltage, the welding current, and a first constant during the positive arc portion, and integrating the instantaneous product of the welding voltage, the welding current, and a second constant during the negative arc portion, where the second constant is about two times the first constant in one preferred implementation.

BRIEF DESCRIPTION OF THE DRAWINGS

The following description and drawings set forth in detail certain illustrative implementations of the invention, which are indicative of several exemplary ways in which the principles of the invention may be carried out. Other objects, advantages and novel features of the invention will become apparent from the following detailed description of the invention when considered in conjunction with the drawings, in which:

FIG. 1 is a schematic diagram illustrating an exemplary pulse welding system in which one or more aspects of the invention may be carried out;

FIGS. 2 and 3 are plots showing conventional DC and AC pulse welding waveforms including a sequence of fixed duration welding cycles;

FIG. 11 is a flow diagram illustrating an exemplary AC pulse welding method in a pulse welding system in accordance with the invention.

DETAILED DESCRIPTION OF THE INVENTION

Figure 4:
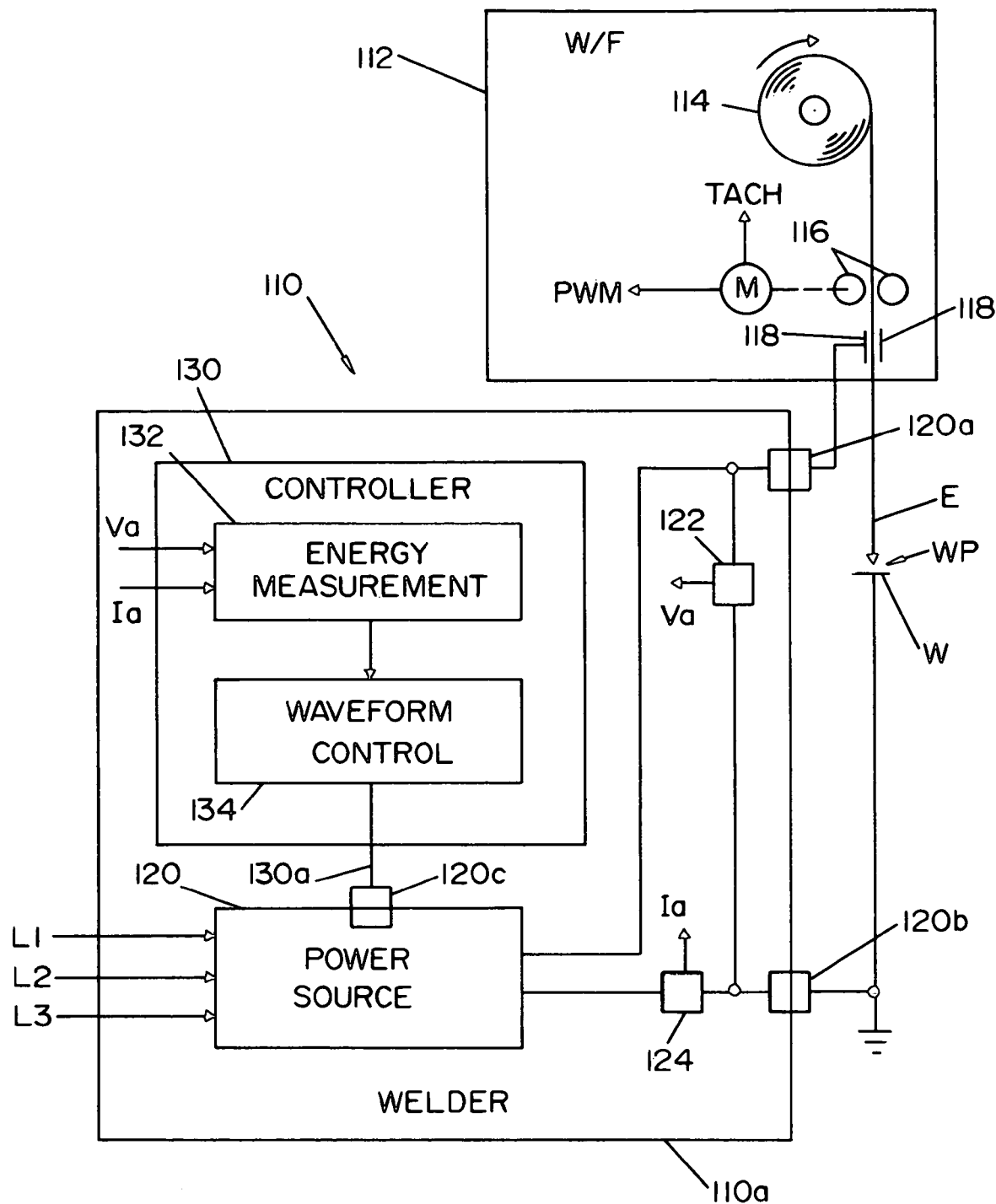
FIG. 4 is a partial schematic diagram illustrating a pulse welding system having a power source and a controller with an energy measurement system in accordance with the present invention.

One or more embodiments or implementations of the present invention are hereinafter described in conjunction with the drawings, wherein like reference numerals are used to refer to like elements throughout and wherein the illustrated structures and waveforms are not necessarily drawn to scale. The invention relates to pulse welding methods and apparatus, and provides for controlled initiation of a transfer or release pulse based on the energy applied to a welding electrode in each pulse welding cycle. In this regard, the invention is directed to pulse welding processes and equipment in which a welder power source applies a welding signal to a consumable welding electrode in a succession of welding cycles, each cycle having a melting condition during which molten metal forms at the end of the electrode as a result of welding current from the power source, and a transfer condition in which a high current pulse in the welding signal causes the molten metal to separate from the electrode before contacting the workpiece or a molten weld pool thereof (e.g., without short-circuiting the electrode and the workpiece). The invention may be implemented in DC pulse welders as well as AC pulse welding applications, and is generally applicable to any type or form of welding equipment and to any pulse welding operation.

Referring initially to FIG. 1, a pulse welding system or pulse welder 10 is illustrated for performing a pulse welding process or operation WP on a workpiece W, where one or more of the various aspects of the invention may be carried out in the exemplary welder 10 or in other pulse welding systems. The welder 10 may perform any type of pulse welding process, such as submerged arc welding (SAW), metal inert gas (MIG) welding, metal active gas (MAG) welding, etc., in which molten metal separates from the end of the welding electrode before the molten metal contacts the workpiece (e.g., no short circuiting between the electrode and the workpiece in steady state operation. Furthermore, the pulse welding process WP may be performed on any type of workpiece materials, such as metals and alloys, for example, aluminum, steel, etc.

The welder 10 includes a power source 20 and a wire feeder 12 that operates to direct a consumable welding wire or electrode E from a spool 14 toward workpiece W by operation of rollers 16, one or more of which are driven by a motor M. Any type of welding wire or electrode E may be used, such as solid wire electrodes, cored electrodes having an inner core and an outer sheath (e.g., flux cored electrodes), etc., as illustrated and described in greater detail below with respect to FIGS. 7A-7H. Electrode E passes through an electrical contact 18 of wire feeder 12, where contact 18 is coupled to an output terminal 20a of power source 20, wherein workpiece W is coupled to a second power source output terminal 20b and to ground. Power source 20 provides an output welding signal that generates welding current through electrode E and workpiece W in a plurality of welding cycles according to a pulse welding waveform as described further hereinafter, wherein a background current heats electrode E during a melting or heating condition of each cycle, and a high current pulse is used to detach molten metal from the electrode E without short circuiting during a transfer condition of each cycle.

Referring briefly to FIGS. 2 and 3, conventional pulse welding techniques are generally susceptible to process fluctuations, leading to intermittent short circuiting and other problems as discussed above. FIG. 2 illustrates a plot 50 showing a DC pulse welding current waveform 52 with a sequence of welding cycles having a generally equal duration or cycle length 54, wherein each cycle includes a transfer pulse 56 in which a relatively high pulse current $I_P$ is provided for a time 56a, and a lower background current level $I_B$ is provided for a fixed time 58 during the melting condition of each cycle. In the past, the pulse duration 56a is fixed and the length 58 of the melting condition were arrived at to adjust heat for DC pulse welding operations. FIG. 3 provides a plot 60 showing an AC pulse welding current waveform 62, which is also of fixed cycle duration 64. As shown in the plot 60, each AC pulse welding cycle includes a transfer pulse 66 of duration 66a at a positive current level $I_P$, as well as an AC heating condition during which the current is initially at a positive background current level $I_B+$ for a time 68a. The heating current then drops to a negative background level $I_B-$ for a time 68b, and finally returns to a positive level for a time 68c before the next transfer pulse 66. As described above, the fixed cycle lengths 54 and 64 and the fixed current levels in the transfer and melting portions of the welding cycles resulted in the conventional pulse welding systems being prone to process variations, leading to undesirable variations in the size of the molten metal ball transferred in each cycle, intermittent short-circuiting, spatter, weld puddle agitation, and/or other adverse results.

Figure 9:
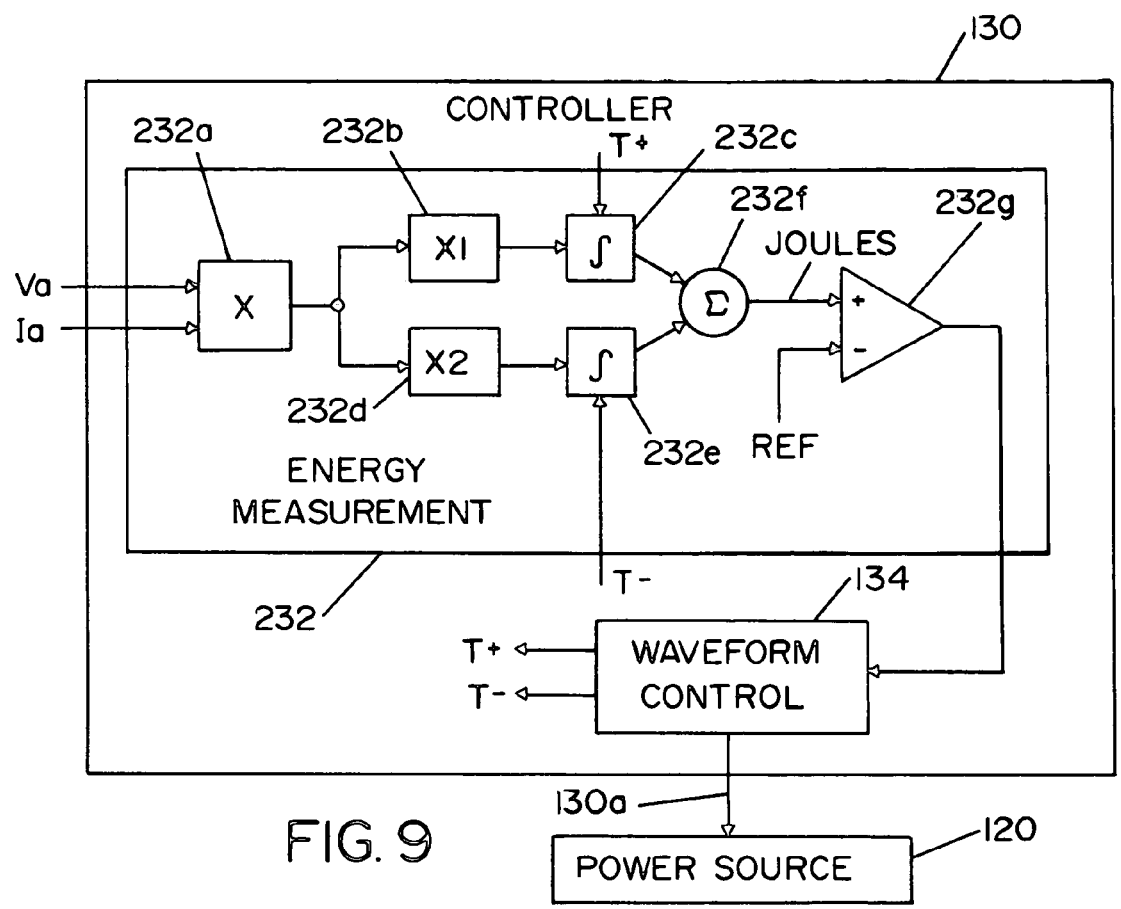
FIG. 9 is a schematic diagram illustrating another implementation of the energy measurement system in the welder of FIG. 4, configured for AC pulse welding.
Figure 10:
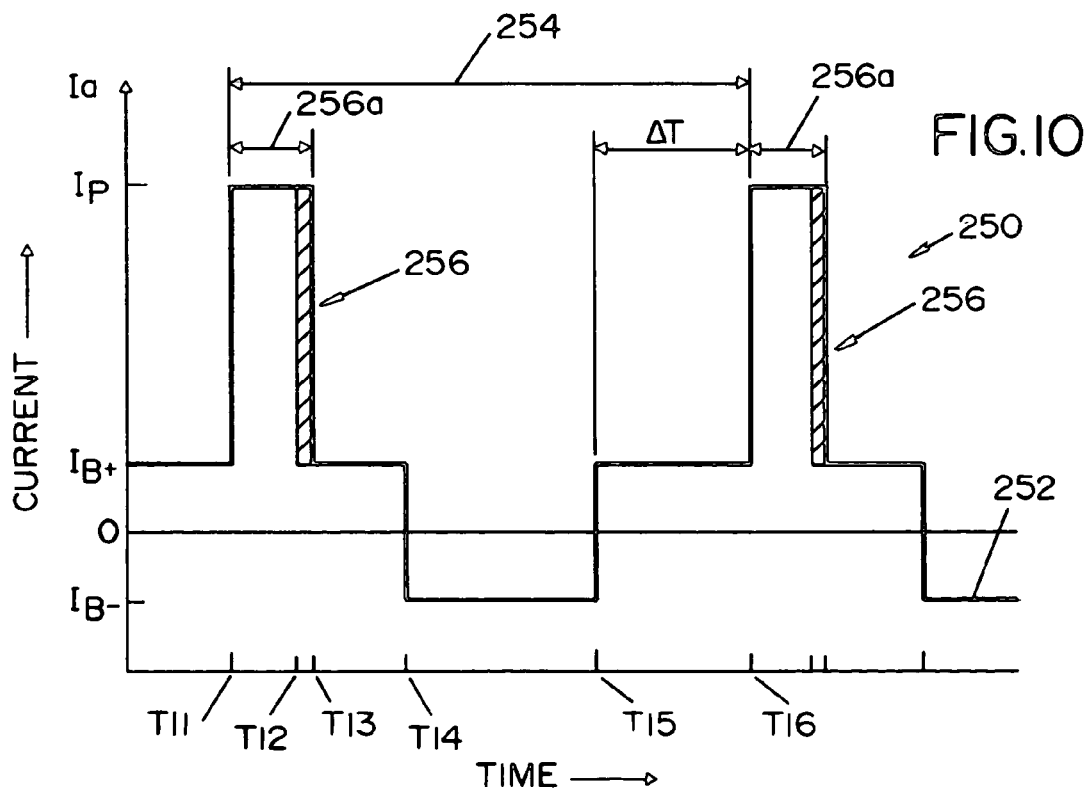
FIG. 10 is a plot showing an exemplary AC pulse welding waveform implementing energy control in the welder of FIGS. 4 and 9 in accordance with the invention.

Referring now to FIGS. 4-7, an exemplary welding system 110 is illustrated for performing a pulse welding process or operation WP on a workpiece W, wherein transferred ball size uniformity is controlled by selectively initiating the transfer condition of each pulse welding cycle according to the amount of energy applied to the welding electrode E in accordance with the present invention. In order to achieve a uniform volume of molten electrode material independent of arc current and voltage fluctuations, the exemplary welder 110 employs an energy determination to totalize the applied energy in each cycle, and the transfer pulse is started when the total applied energy reaches a predetermined threshold. Moreover, as the applied energy can be correlated to the volume of molten metal forming at the end of the welding electrode E, wherein the exemplary welder 110 can be further adapted to take into account different volumetric melting rates for different applied current polarities when performing AC pulse welding. The welding system 110 is initially illustrated and described in the context of DC pulse welding (FIGS. 4-8), and thereafter is shown for AC pulse welding applications (FIGS. 9-11).

The exemplary pulse welder 110 is illustrated in FIG. 4 as a combined power source 120 and controller 130 in a single housing 110a, along with a separately housed wire feeder 112, although other implementations are possible within the scope of the invention in which the wire feeder 112 and the power source 120 are provided in a single enclosure (not shown). Wire feeder 112 draws welding wire E from a supply spool or reel 114 and directs electrode E toward workpiece W via rollers 116 and a corresponding drive motor M, wherein the advancing wire E is electrically coupled to one or more contacts 118 to receive a welding signal from power source 120 such that a welding current is established through electrode E to create a welding arc between electrode E and workpiece W (e.g., welding arc A as shown in FIGS. 7A-7F below) during welding process WP. Contacts 118 of wire feeder 112 are connected to a first output terminal 120a of power source 120, with a second output terminal 120b being coupled to workpiece W and to ground. Any suitable wire feeding system or apparatus 112 may be employed for directing electrode E toward workpiece W within the scope of the invention. The system 110 further comprises a voltage sensor 122 providing a sensed voltage signal Va to controller 130 to indicate the sensed welding voltage (e.g., arc voltage), and a current sensor 124 (e.g., shunt) in the return path to sense a welding current (e.g., arc current) being provided to electrode E and to provide a sensed current signal Ia to controller 130, wherein any suitable sensors, shunts, or other devices may be employed for sensing the welding voltage and current in order to ascertain the applied energy in a pulse welding cycle within the scope of the invention.

Power source 120 can be any device that provides electrical power in the form of a welding signal to electrode E for pulse welding workpiece W, such as the Lincoln Power Wave 455 and other Power Wave power sources sold by The Lincoln Electric Company of Cleveland, Ohio, wherein the illustrated power source 120 receives single or multi-phase AC input power on lines L1-L3 from an external supply (not shown) and includes first and second output terminals 120a and 120b, as well as a control input terminal 120c for receiving a control input signal 130a from controller 130. In operation, power source 120 provides an output welding signal that generates welding current Ia through electrode E and workpiece W and creates an arc A therebetween in a plurality of welding cycles according to control signal 130a, wherein controller 130 may be separate from or integrated within power source 120, and can be any suitable hardware, software, or combinations thereof. Controller 130 comprises an energy measurement system 132 that is operative to determine the energy applied to welding electrode E in each pulse welding cycle based on the sensed current and voltage signals Ia and Va, respectively, and also includes a waveform control system 134 that provides control signal 130a in accordance with a pulse welding waveform. In accordance with an aspect of the invention, moreover, control input signal 130a is provided such that a transfer pulse is provided in the welding signal to initiate the transfer condition of each welding cycle based at least partially on the total applied energy.

Figure 5:
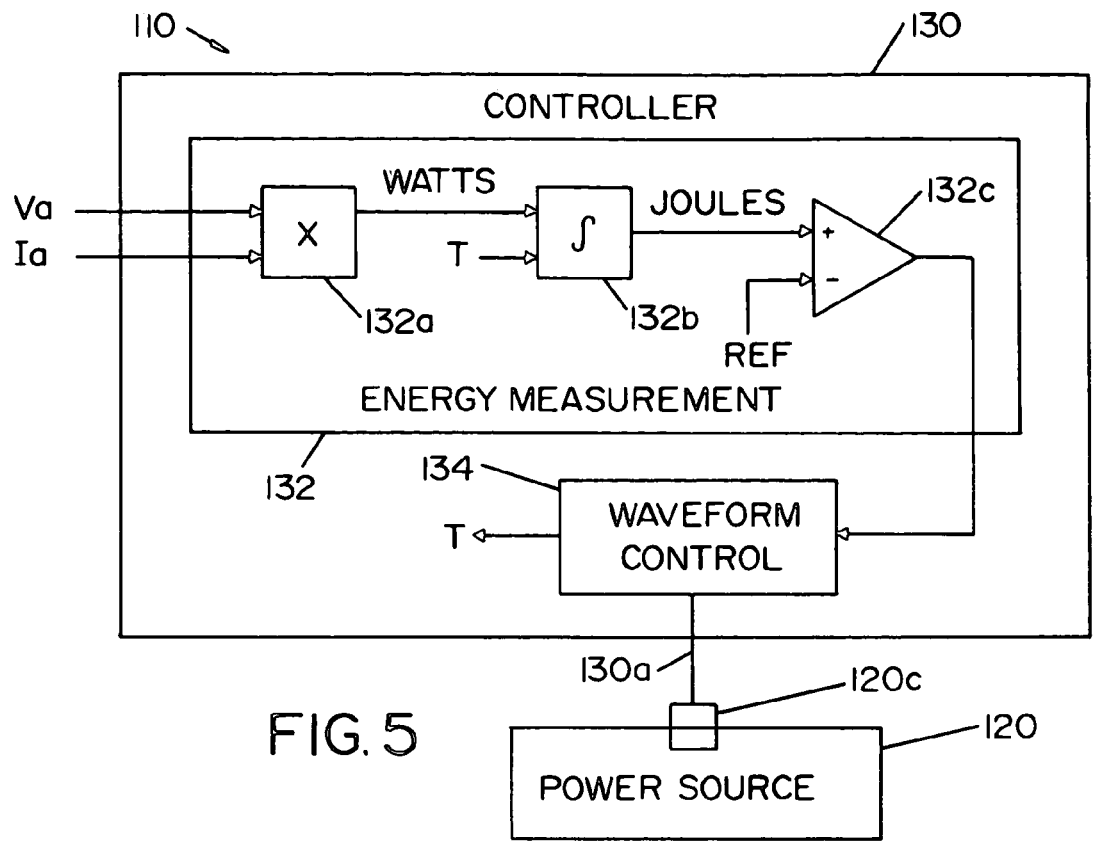
FIG. 5 is a schematic diagram illustrating further details of an energy measurement system in the welder of FIG. 4, configured for DC pulse welding.

One exemplary energy measurement system 132 is shown in FIG. 5 for DC pulse welding processes WP, wherein a multiplier 132a receives current and voltage sensor signals Ia and Va and provides an output (e.g., power signal) to an integrator 132b. Integrator 132b integrates or totalizes the power product over a time T from waveform control system 134, and provides a totalized energy output to a comparator 132c. Comparator 132c compares the total energy during a given welding cycle to a reference value REF, which can be any predetermined value, and provides a comparator output signal or a state transition thereof to waveform control system 134. Thus configured, the exemplary energy measurement system 132 will provide the comparator output to signify the time in each welding cycle at which the total energy applied to welding electrode E has reached the value of the reference REF. While the implementation in FIGS. 4 and 5 is illustrated in a circuit configuration, the principles of the invention can also be employed in other hardware, software, or combined hardware/software embodiments, for example, wherein the energy determination can be calculated within the waveform generator 134 based on sensed or predicted current and voltage conditions to determine when the proper volume of molten electrode has been formed at the end of electrode E. In this regard, the DC pulse welding energy determination can be made to ascertain when a predetermined amount X of energy (joules) has been delivered to welding electrode E according to the following equation (1):

$$X = Va * Ia * T, \quad (1)$$

wherein controller 130 will automatically generate signal 130a according to a transition in the comparator output when the totalized applied energy becomes greater than or equal to a preselected value for X (REF in FIG. 5), causing power source 120 to apply the pinch current pulse to initiate the transfer condition of the welding cycle.

Referring also to FIGS. 6 and 7A-7F, the inventors have found that the energy applied to welding electrode E can be correlated with the amount or volume of molten material that has been melted at the electrode end in a given cycle, and the comparator output can be used to controllably initiate the corresponding transfer current pulse, whereby droplet or ball size is uniform from cycle to cycle. This novel pulse welding energy control facilitates avoidance or mitigation of short-circuit conditions and the associated spatter problems highlighted above, and also helps to mitigate pool contamination or puddle agitation cause by excessive arc force, thereby allowing the pulse welding process WP to be optimized by selection of the predetermined threshold value REF for a given welding electrode material type, lineal welding speed, deposition rate, heat control requirements, and/or other relevant process variables.

Figure 6:
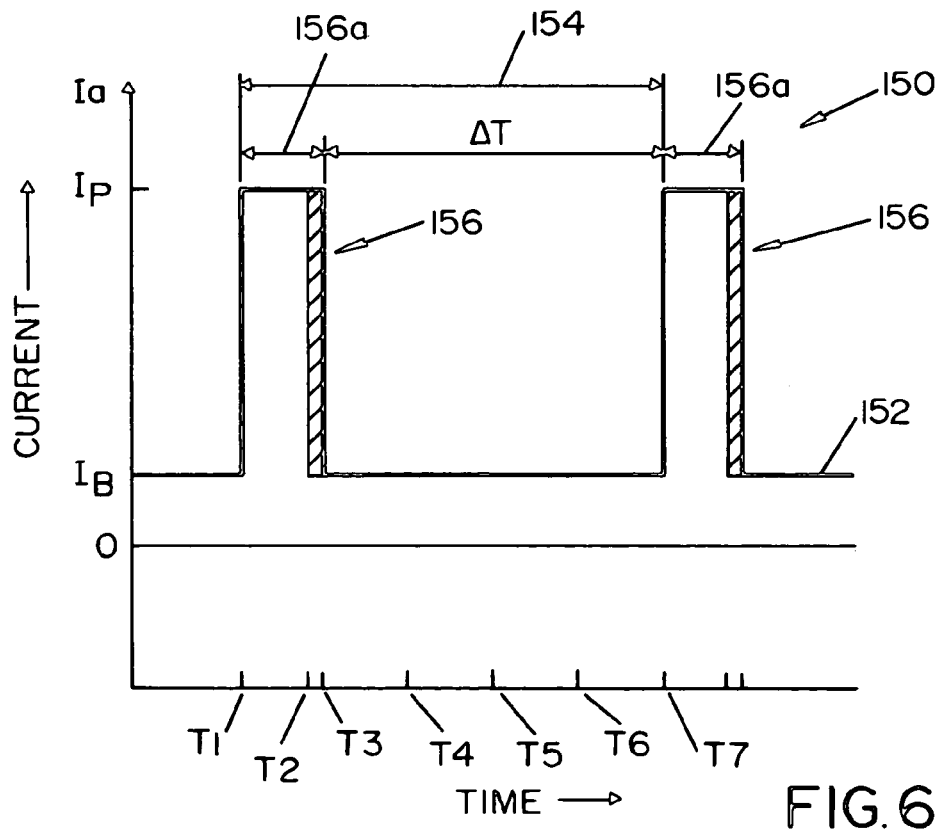
FIG. 6 is a plot showing an exemplary DC pulse welding waveform implementing energy control in the welder of FIGS. 4 and 5 in accordance with the invention.

FIG. 6 provides a plot 150 illustrating an exemplary arc current waveform 152 using the energy control concepts of the invention in a DC pulse welding operation in the system 10, wherein each welding cycle 154 includes a transfer condition with a current pulse 156 at level $I_P$ for a duration 156a, and a heating or melting condition with a controlled variable time duration $\Delta T$ at a background current level $I_B$, wherein the duration of each cycle 154 is variable according to the applied electrode energy determination. It is noted at this point that a 154 cycle could be defined as beginning with the pulse condition as shown in FIG. 6, or may be alternatively defined as ending with the pulse condition, or any arbitrary point could be selected as the start of a cycle, wherein the invention contemplates any definition of a pulse welding cycle in which a transfer condition and a melting condition exist without short-circuiting.

Figure 7F:
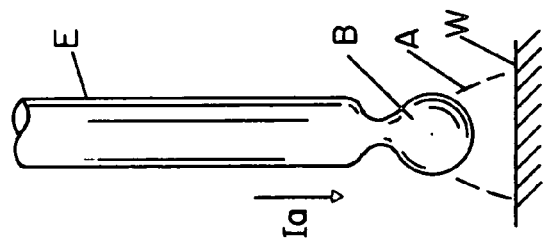
FIGS. 7A-7F are partial side elevation views illustrating formation and eventual separation of molten metal balls at the end of the welding electrode in the welder of FIGS. 4 and 5.
Figure 7E:
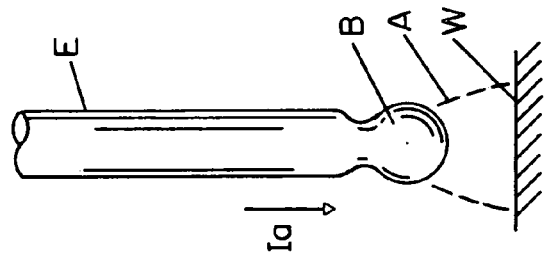
Figure 7D:
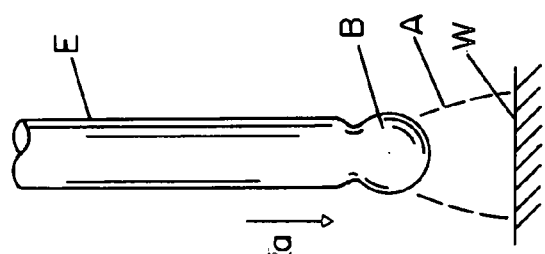
Figure 7C:
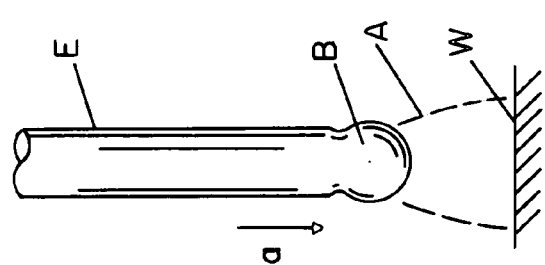
Figure 7B:
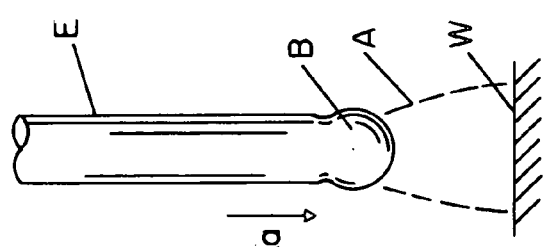
Figure 7A:
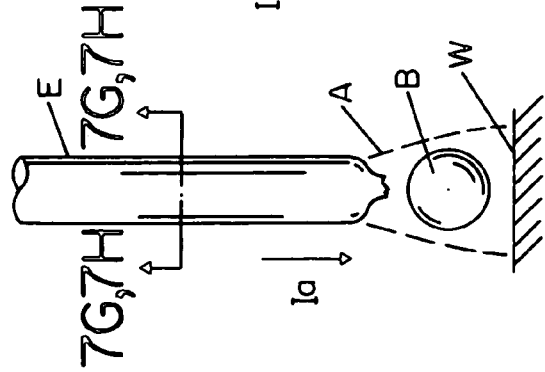

Referring to FIGS. 6 and 7A, plot 150 shows the exemplary DC pulse welding cycle 154, where the electrode current 152 transitions from the background level $I_B$ to the higher pulse level $I_P$ at time T1 to begin the cycle 154 with a transfer condition. The pulse current $I_P$ is maintained for a pulse duration 156a in FIG. 6 from time T1 to a time T3, which may be a fixed time tailored to a given welding operation WP, workpiece heating concerns, or other considerations. One particular advantage of the present invention is that since the pulse 156 is begun when a molten ball B of a generally predictable fixed size is ready for transfer, the pulse 156 can be set to a somewhat minimal duration or width 156a such that successful ball propulsion is ensured without excess pulse heating, wherein the ball B will be ejected at some intermediate time T2 between T1 and T3 (e.g., the ball size uniformity advantages of the invention allow the time T3 to be shortly after T2). FIG. 7A illustrates electrode E and dislodged molten metal ball B between times T2 and T3, wherein ball B is transferred through arc A without short-circuiting electrode E to workpiece W or to a molten metal weld pool thereof. The energy totalization is begun at any suitable time during the cycle 154, for example, at T1, although the applied energy calculation can be started at other times within the scope of the invention. In a preferred implementation of the invention, the current Ia is brought down at time T3 from the pulse level $I_P$ to the background level $I_B$, with time T3 being relatively soon after time T2. In this regard, the shaded portion of the pulse 156 in FIG. 6 between times T2 and T3 may contribute somewhat to melting of a subsequently formed ball B as shown in FIG. 7B at time T3, wherein the amount of such pulse heating may be minimized using the invention, such that pulse 156 operates primarily to dislodge molten ball B in each cycle 154.

As further illustrated in FIGS. 6 and 7C-7E, background current $I_B$ is continued throughout the heating condition after time T3, while controller 130 (e.g., and energy measurement system 132 thereof) integrates the instantaneous product of welding current Ia and welding voltage Va, and continuously checks whether the total applied energy in the current cycle 154 has reached preselected value REF (FIG. 5 above). This melting or heating condition operation is thus continued through times T4, T5, and T6 in plot 150, corresponding to FIGS. 7C, 7D, and 7E, respectively, with background current $I_B$ heating electrode E to contribute more electrode material to molten material B at the electrode end, where background current level $I_B$ may be selected so as to facilitate control of the workpiece heating resulting from arc A or other considerations. Furthermore, the current and voltages applied in the welding signal need not be constant, since the energy totalization ensures ball size uniformity regardless of such signal variations. In accordance with the invention, moreover, the heating time ΔT is ended and the next pulse 156 is applied at time T7 (FIG. 7F) based on the energy measurement (e.g., when the total applied energy reaches the predetermined value corresponding to the desired ball volume), whereby the duration of each welding cycle 154 may vary from cycle to cycle to achieve ball size uniformity. Once the next cycle 154 has begun, the energy determination apparatus or software is reset or restarted and energy measurement system 132 begins totalizing the instantaneous power for the next cycle 154. In this manner, welding process WP (FIG. 4) is regulated against process fluctuations, whereby even as arc voltage Va and/or current Ia may vary, the control will make suitable adjustments to the melting or heating time ΔT to attain the desired energy (joules X) and thus the desired size of the transferred ball B.

Figure 7H:
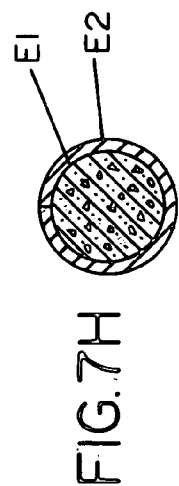
FIG. 7H is a partial plan view in section taken along line 7G-7G of FIG. 7A showing an alternative use of a flux cored electrode in the welder of FIGS. 4 and 5 having a core with granular flux and alloy materials and an outer sheath.
Figure 7G:
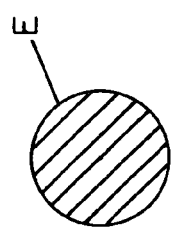
FIG. 7G is a partial plan view in section taken along line 7G-7G of FIG. 7A showing a solid wire welding electrode E in the welder of FIGS. 4 and 5.

As shown in FIGS. 7A, 7G, and 7H, the various aspects of the invention may be carried out using any type of welding wire or electrode E. FIG. 7G illustrates a sectional view along line 7G-7G of FIG. 7A, showing a solid wire welding electrode E in the welder of FIGS. 4 and 5. Another possible implementation is shown in FIG. 7H wherein the electrode is a flux cored electrode having a core E1 with granular flux and alloy materials and an outer sheath E2 formed around the core E1.

Figure 8:
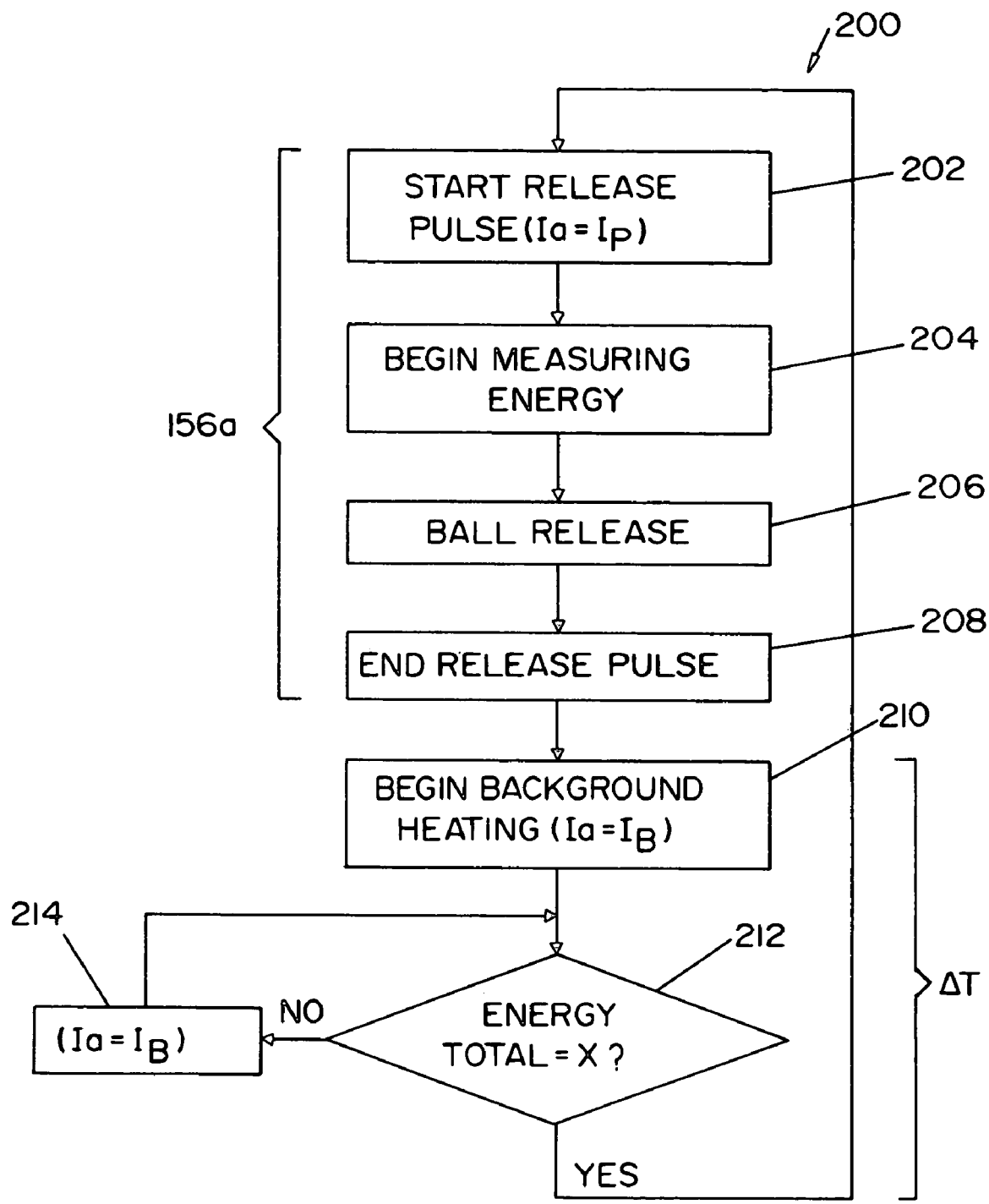
FIG. 8 is a flow diagram illustrating an exemplary DC pulse welding method in a pulse welding system in accordance with another aspect of the invention.

FIG. 8 illustrates an exemplary method 200 for welding a workpiece using a sequence of DC pulse welding cycles in accordance with the invention. Although the exemplary process or method 200 and other methods of the invention are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Moreover, the methods of the invention may be carried out in conjunction with various systems and apparatus illustrated and described herein, as well as in association with other systems not illustrated. At 202-208, a high current transfer or release pulse is applied during a transfer condition (during pulse duration 156a of FIG. 6 above), and a controlled duration heating condition is undertaken at 210-214 (time ΔT) in each DC pulse welding cycle 154.

The transfer or release pulse is initiated at 202 according to the amount of energy applied to welding electrode E in the previous cycle, wherein electrode current Ia is brought to a pulse current level $I_P$ at 202 and the applied energy measurement begins at 204. As noted above, the applied energy measurement may be started at other points in a given cycle within the scope of the invention. Furthermore, any form of energy determination may be undertaken in the methods of the invention, including but not limited to integrating or totalizing the instantaneous applied power (e.g., current× voltage product) as illustrated in the example of FIG. 5 above). At some time following the pulse initiation (e.g., time T2 in FIG. 6), molten ball B is detached or released at 206 from electrode E, and pulse 156 is thereafter ended at 208 (e.g., time T3 in FIG. 6). Background heating begins at 210 with welding current Ia being reduced to a lower level $I_B$ at time T3, and a determination is made at 212 as to whether the total applied energy has reached a predetermined value X (e.g., whether comparator 132c in FIG. 5 has determined that the energy output of integrator 132b is greater than or equal to threshold value REF). If not (NO at 212), the current is maintained at 214 (Ia=$I_B$) This condition is again tested at 212 and the method 200 proceeds at 212 and 214 until the predetermined energy level has been applied to electrode E (YES at 212), at which time, the heating period ΔT ends, and another release pulse is started at 202 to begin another DC pulse welding cycle.

Referring now to FIGS. 9-11, the invention is further applicable in AC pulse welding operations, for example, in AC welding of aluminum. In this instance, when the electrode current polarity is reversed (electrode negative), the arc energy is more focused on electrode E, causing a larger ball B to be formed as compared to the ball formed for the same energy when electrode E is positive (e.g., faster melting during electrode negative portions of AC welding waveform). In such an AC welding application, it is still desirable to transfer molten balls or droplets B of uniform size, wherein controller 130 can be configured to account for the different melting rates for positive and negative arc portions of the AC waveform, and to initiate transfer of the molten material B from the end of electrode E when a totalized value reaches a predetermined threshold, whereby ball size uniformity can be achieved in AC pulse welding processes. In one implementation shown in FIG. 9, the polarity dependent energy focusing can be accounted for by computing the total applied energy using suitable first and second constants or scaling factors K1 and K2 according to the following equation (2):

$$X = K1(Va^+ * Ia^+ * T^+) + K2(Va^- * Ia^- * T^-), \qquad (2)$$

where Va+ and Ia+ are the positive welding voltage and current values during the time T+ that the waveform is positive (positive electrode portion), and where Va– and Ia– are the welding voltage and current values during the negative electrode time T–. In the illustrated example, moreover, first constant K1 is unity and second constant K2 is approximately two, although any suitable constants or ratios thereof may be used within the scope of the invention.

As shown in FIG. 9, controller 130 may include an energy measurement system 232 for such AC pulse welding, in which a multiplier 232a receives sensor signals Ia and Va and provides an output (e.g., instantaneous power) to a pair of parallel scaling multipliers 232b and 232d. The first scaling multiplier 232b in the illustrated example multiplies the power output of the multiplier 232a by a first constant K1 (e.g., unity in this example) and provides an output to a first integrator 232c. Integrator 232c totalizes the power only during the time T+ that the electrode current Ia is positive (e.g., flowing from electrode E to workpiece W), wherein first integrator 232c is controlled according to a T+ signal from waveform generator 134. Thus, while current Ia is positive, first integrator 232c integrates the output from multiplier 232b and stops integrating when the current is negative. Similarly, a second parallel path includes the second scaling multiplier 232d (e.g., multiplies the power product from multiplier 232a by a second constant K2, in this example, about 2) and a second integrator 232e which operates to totalize the scaled power from multiplier 232d according to a T– signal from waveform generator 134, such that while current Ia is negative, integrator 232e integrates the output from multiplier 232d and stops integrating when the current returns positive. The outputs of integrators 232c and 232e are summed using a summer 232f that provides an input to a comparator 232g. The output of comparator 232g transitions when the total energy output of summer 232f reaches reference value REF as in the above DC pulse welding example of FIG. 5, and this output signal level transition is used by waveform generator 134 to provide control signal 130a to power source 120 for initiating a transfer pulse.

Referring also to FIG. 10, a plot 250 illustrates an exemplary AC pulse welding current waveform 252 for welding current Ia as a function of time as created using welder 110 with controller 130 of FIG. 9. As with the DC pulse welding described above, AC welding waveform 250 is used to create a plurality of welding cycles 254 individually including a transfer condition in which a current pulse 256 is provided at a current level $I_p$ for a duration 256a to separate molten metal from the end of electrode E without short-circuiting, and a heating condition during which electrode current Ia heats electrode E to form molten metal B thereon, wherein the heating or melting condition includes both positive and negative current polarities. The release or transfer pulse 256 is initiated at a. time T11 with current Ia being provided at a high value $I_P$ until time T13, wherein pulse duration 256a (e.g., T13-T11) may be minimized such that ball B is actually released at time T12 a short time prior to termination of pulse 256 at T13, wherein FIG. 7A illustrates electrode E and dislodged molten metal ball B between times T12 and T13. The melting condition begins at time T13, wherein electrode current Ia drops to a positive background level $I_{B+}$ until time T14, and from there transitions to a negative background current $I_{B-}$ from T14 until T15. Thereafter, current Ia is again brought to $I_{B+}$ from T15 through T16 and the corresponding time $\Delta T$ is ended at T16 according to signal 130a based on the energy applied to electrode E to achieve ball size uniformity through energy control in accordance with the invention. The next cycle thus begins at T16 with the application of the next pulse 256 (FIG. 7F) based on the energy measurement (e.g., when the total applied energy reaches the predetermined value corresponding to the desired ball volume), whereby the duration of each welding cycle 254 may vary from cycle to cycle to ensure ball size uniformity. As with the above DC pulse welding example, the energy determination is reset and energy measurement system 132 begins totalizing the instantaneous power for the next cycle 254. It is noted at this point that the current may change polarity any number of times in an AC pulse welding cycle within the scope of the invention, and the heating condition waveforms need not be flat as in the illustrated example, and further the pulse 256 may be provided at any point in the waveform 252, wherein the illustrated waveform is merely one example. Moreover, as discussed above, the energy determination and comparison aspects of the invention may alternatively be implemented using software, hardware, or combinations thereof, wherein the illustrated controller 130 is but one example of an implementation within the scope of the present invention.

Referring also to FIG. 11, another exemplary pulse welding method 300 is illustrated in accordance with the invention, in which AC welding currents are used. At 302, the release pulse is started at a time determined according to the energy applied to electrode E in the previous cycle, with electrode current Ia being brought to a pulse level $I_P$. At 304, measurement of applied energy begins for the current cycle, wherein the measurement may be started at other points in a given cycle within the scope of the invention. Some time following the pulse initiation, molten ball B is released at 306 from electrode E (e.g., time T13 in FIG. 10), and pulse 256 is thereafter ended at 308 (e.g., time T13 in FIG. 10). AC background heating begins at 310 with welding current Ia being reduced to a positive background level $I_{B+}$ at 310 from time T13 through a time T14 during a first positive arc portion of the melting condition of cycle 254, and current Ia is then reversed at 312 to a negative background level $I_{B-}$ from time T14 through time T15. A second positive portion is then begun at 314 by returning the current to $I_{B+}$ (T15). A determination is made at 316 as to whether the total applied energy has reached a predetermined value X, and if not (NO at 316), the current is maintained at 318 (Ia=$I_{B+}$), and the process is repeated at 316 and 318 until the predetermined energy level has been applied to electrode E (YES at 316), at which time (T16 in FIG. 10) another release pulse is started at 302 to begin the next AC pulse welding cycle.

The invention has been illustrated and described with respect to one or more exemplary implementations or embodiments. However, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

Having thus described the invention, the following is claimed:

1. A pulse welding system for welding a workpiece in a pulse welding process, said pulse welding system comprising: a wire feeder adapted to direct a welding electrode toward a workpiece; a power source having an output terminal coupled with said welding electrode and a control input terminal, said power source providing a welding signal at said output terminal according to a control input signal at said control input terminal in a succession of welding cycles, each said welding cycle including a melting condition during which said welding signal heats an end of said welding electrode to form molten metal at said end and a transfer condition in which said molten metal is separated from said end of said welding electrode before said molten metal contacts said workpiece; and a controller coupled to said control input terminal of said power source, said controller comprising an energy measurement system for determining the energy applied to said welding electrode in each said welding cycle, said controller providing said control input signal such that a pulse is provided in said welding signal to initiate said transfer condition of each said welding cycle when the energy applied to said welding electrode in said welding cycle reaches a predetermined energy value.

2. A pulse welding system as defined in claim 1, further comprising a voltage sensor coupled with said controller and with said output terminal, said voltage sensor being adapted to sense a welding voltage and to provide a sensed voltage signal indicative of said welding voltage to said controller; and a current sensor coupled with said controller and with said output terminal of said power source, said current sensor being adapted to sense a welding current being provided by said power source to said welding electrode and to provide a sensed current signal indicative of said welding current to said controller; wherein said energy measurement system is adapted in each said welding cycle to create a power signal based on said sensed voltage signal and said sensed current signal as the instantaneous product of said welding voltage and said welding current, wherein said energy measurement system is adapted to integrate said power signal to provide an energy signal indicative of said energy applied to said welding electrode, and wherein said energy measurement system is further adapted to compare said energy signal with said predetermined energy value and to cause said controller to provide said pulse is provided in said welding signal to initiate said transfer condition when said energy signal reaches said predetermined energy value.

3. A pulse welding system as defined in claim 2, wherein said controller provides said control input signal to create said welding signal comprising alternating current during said melting condition, and wherein said melting condition comprises a positive arc portion in which said welding current flows from said welding electrode to said workpiece and a negative arc portion in which said welding current flows from said workpiece to said welding electrode.

4. A pulse welding system as defined in claim 3, wherein said energy measurement system computes said energy as the sum of energy applied to said welding electrode during said positive arc portion and energy applied to said welding electrode during said negative arc portion.

5. A pulse welding system as defined in claim 4, wherein said energy measurement system is adapted in said positive arc portion of each said welding cycle to compute said energy applied to said welding electrode during said positive arc portion by integrating the instantaneous product of said welding voltage, said welding current, and a first constant during said positive arc portion; and wherein said energy measurement system is adapted in said negative arc portion of each said welding cycle to compute said energy applied to said welding electrode during said negative arc portion by integrating the instantaneous product of said welding voltage, said welding current, and a second constant during said negative arc portion.

6. A pulse welding system as defined in claim 5, wherein said second constant is about two times said first constant.

7. A pulse welding system as defined in claim 1, wherein said controller provides said control input signal to create said welding signal comprising alternating current during said melting condition, and wherein said melting condition comprises a positive arc portion in which welding current flows from said welding electrode to said workpiece and a negative arc portion in which said welding current flows from said workpiece to said welding electrode.

8. A pulse welding system as defined in claim 7, wherein said energy measurement system computes said energy as the sum of energy applied to said welding electrode during said positive arc portion and energy applied to said welding electrode during said negative arc portion.

9. A pulse welding system as defined in claim 1, wherein said welding electrode is a solid wire electrode.

10. A pulse welding system as defined in claim 1, wherein said welding electrode is a cored electrode having an inner core and an outer sheath.

11. A pulse welding system as defined in claim 1, wherein said pulse welding process is a submerged arc welding process.

12. A pulse welding system as defined in claim 1, wherein said pulse welding process is a metal inert gas welding process.

13. A pulse welding system as defined in claim 1, wherein said pulse welding process is a metal active gas welding process.

14. A pulse welding system as defined in claim 1, wherein said workpiece comprises aluminum.

15. A pulse welding system as defined in claim 1, wherein said workpiece comprises steel.

16. A pulse welding system as defined in claim 1, wherein said controller provides said control input signal to create said welding signal comprising current of a single polarity during said melting condition and during said transfer condition.

17. A pulse welding system as defined in claim 16, wherein said welding signal comprises a positive arc polarity in which welding current flows from said welding electrode to said workpiece during said melting condition and during said transfer condition.

18. A control system for providing a control input signal to a pulse welding power source providing a welding signal to a welding electrode at an output terminal according to said control input signal in a succession of welding cycles, each said welding cycle including a melting condition during which said welding signal heats an end of said welding electrode to form molten metal at said end and a transfer condition in which said molten metal is separated from said end of said welding electrode before said molten metal contacts said workpiece, said control system comprising: an energy measurement system for measuring the energy applied to said welding electrode in each said welding cycle, said control system providing said control input signal such that a pulse is provided in said welding signal to initiate said transfer condition of each said welding cycle when the energy applied to said welding electrode in said welding cycle reaches a predetermined energy value.

19. A control system as defined in claim 18, wherein in each said welding cycle said energy measurement system creates a power signal as the instantaneous product of a welding voltage and a welding current, wherein said energy measurement system is adapted to integrate said power signal to provide an energy signal indicative of said energy applied to said welding electrode, and wherein said energy measurement system is further adapted to compare said energy signal with said predetermined energy value and to cause said control system to provide said pulse is provided in said welding signal to initiate said transfer condition when said energy signal reaches said predetermined energy value.

20. A control system as defined in claim 19, wherein said control system provides said control input signal to create said welding signal comprising alternating current during said melting condition, wherein said melting condition comprises a positive arc portion in which said welding current flows from said welding electrode to said workpiece and a negative arc portion in which said welding current flows from said workpiece to said welding electrode, and wherein said energy measurement system computes said energy as the sum of energy applied to said welding electrode during said positive arc portion and energy applied to said welding electrode during said negative arc portion.

21. A control system as defined in claim 20, wherein said energy measurement system is adapted in said positive arc portion of each said welding cycle to compute said energy applied to said welding electrode during said positive arc portion by integrating the instantaneous product of said welding voltage, said welding current, and a first constant during said positive arc portion; and wherein said energy measurement system is adapted in said negative arc portion of each said welding cycle to compute said energy applied to said welding electrode during said negative arc portion by integrating the instantaneous product of said welding voltage, said welding current, and a second constant during said negative arc portion.

22. A control system as defined in claim 21, wherein said second constant is about two times said first constant.

23. A control system as defined in claim 18, wherein said control system provides said control input signal to create said welding signal comprising alternating current during said melting condition, wherein said melting condition comprises a positive arc portion in which welding current flows from said welding electrode to said workpiece and a negative arc portion in which said welding current flows from said workpiece to said welding electrode, and wherein said energy measurement system computes said energy as the sum of energy applied to said welding electrode during said positive arc portion and energy applied to said welding electrode during said negative arc portion.

24. A pulse welding system for welding a workpiece, said pulse welding system comprising: a wire feeder adapted to direct a welding electrode toward a workpiece; a power source having an output terminal coupled with said welding electrode and a control input terminal, said power source providing a welding signal at said output terminal according to a control input signal at said control input terminal in a succession of welding cycles, each said welding cycle including a melting condition during which said welding signal heats an end of said welding electrode to form molten metal at said end and a transfer condition in which said molten metal is separated from said end of said welding electrode before said molten metal contacts said workpiece; and a controller providing said control input signal such that a pulse is provided in said welding signal to initiate said transfer condition of each said welding cycle when the energy applied to said welding electrode in said welding cycle reaches a predetermined energy value.

25. A pulse welding system as defined in claim 24, further comprising a voltage sensor coupled with said controller and with said output terminal, said voltage sensor being adapted to sense a welding voltage and to provide a sensed voltage signal indicative of said welding voltage to said controller; and a current sensor coupled with said controller and with said output terminal of said power source, said current sensor being adapted to sense a welding current being provided by said power source to said welding electrode and to provide a sensed current signal indicative of said welding current to said controller; wherein said controller creates a power signal based on said sensed voltage signal and said sensed current signal as the instantaneous product of said welding voltage and said welding current, wherein said controller integrates said power signal to provide an energy signal indicative of said energy applied to said welding electrode, and wherein said controller compares said energy signal with said predetermined energy value and provides said pulse in said welding signal to initiate said transfer condition when said energy signal reaches said predetermined energy value.

26. A pulse welding system as defined in claim 24, wherein said controller provides said control input signal to create said welding signal comprising alternating current during said melting condition, and wherein said melting condition comprises a positive arc portion in which said welding current flows from said welding electrode to said workpiece and a negative arc portion in which said welding current flows from said workpiece to said welding electrode.

27. A pulse welding system as defined in claim 26, wherein said controller computes said energy as the sum of energy applied to said welding electrode during said positive arc portion and energy applied to said welding electrode during said negative arc portion.

28. A pulse welding system as defined in claim 27, further comprising a voltage sensor for sensing a welding voltage; and a current sensor for sensing a welding current being provided by said power source to said welding electrode; wherein said controller computes said energy applied to said welding electrode during said positive arc portion by integrating the instantaneous product of said welding voltage, said welding current, and a first constant during said positive arc portion; and wherein said controller is adapted in said negative arc portion of each said welding cycle to compute said energy applied to said welding electrode during said negative arc portion by integrating the instantaneous product of said welding voltage, said welding current, and a second constant during said negative arc portion.

29. A pulse welding system as defined in claim 28, wherein said second constant is about two times said first constant.

30. A pulse welding system for welding a workpiece, said pulse welding system comprising: a wire feeder directing a welding electrode toward a workpiece; and a power source providing a welding signal to said welding electrode in a plurality of welding cycles, each said welding cycle including a melting condition during which said welding signal heats an end of said welding electrode to form molten metal at said end and a transfer condition in which said molten metal is separated from said end of said welding electrode before said molten metal contacts said workpiece, wherein said power source provides a pulse in said welding signal to initiate said transfer condition of each said welding cycle based at least partially on an amount of energy applied to said welding electrode in said welding cycle and wherein said rulse is provided to initiate said transfer condition of each said welding cycle when energy applied to said welding electrode in said welding cycle reaches a predetermined energy value.

31. In a pulse welding system, a method for welding a workpiece, said method comprising:
providing a welding signal to a welding electrode in a succession of welding cycles, each said welding cycle including a melting condition during which said welding signal heats an end of said welding electrode to form molten metal at said end and a transfer condition in which said molten metal is separated from said end of said welding electrode before said molten metal contacts said workpiece;
determining the energy applied to said welding electrode in each said welding cycle; and
providing a pulse to initiate said transfer condition of each said welding cycle based at least partially on an amount of energy applied to said welding electrode in said welding cycle;
wherein said pulse is provided to initiate said transfer condition of each said welding cycle when energy applied to said welding electrode in said welding cycle reaches a predetermined energy value.

32. A method as defined in claim 31, wherein determining said energy comprises sensing a welding voltage and a welding current in each said welding cycle and integrating the instantaneous product of said welding voltage and said welding current during each said cycle.

33. A method as defined in claim 31, wherein providing said welding signal comprises providing an alternating current during said melting condition, and wherein said melting condition comprises a positive arc portion in which welding current flows from said welding electrode to said workpiece and a negative arc portion in which said welding current flows from said workpiece to said welding electrode.

34. A method as defined in claim 33, wherein determining said energy in each said welding cycle comprises:

sensing a welding voltage and a welding current in each said welding cycle;

integrating the instantaneous product of said welding voltage, said welding current, and a first constant during said positive arc portion; and integrating the instantaneous product of said welding voltage, said welding current, and a second constant during said negative arc portion.

35. A method as defined in claim 34, wherein said second constant is about two times said first constant.

* * * * *